United States Patent

Watson

[11] Patent Number: 5,795,075
[45] Date of Patent: Aug. 18, 1998

[54] SPRING CARTRIDGE ROTOR BEARING

[75] Inventor: Arthur I. Watson, Fredericksburg, Tex.

[73] Assignee: Camco International Inc., Houston, Tex.

[21] Appl. No.: 707,552

[22] Filed: Sep. 4, 1996

[51] Int. Cl.[6] ............................................ F16C 33/04
[52] U.S. Cl. ............................................ 384/215; 384/278
[58] Field of Search ...................... 384/215, 278, 384/219, 218, 37, 38

[56] References Cited

U.S. PATENT DOCUMENTS

| | | | |
|---|---|---|---|
| 1,554,299 | 9/1925 | Seibel . | |
| 3,565,496 | 2/1971 | Latussek et al. | 384/219 |
| 3,982,797 | 9/1976 | Tschirky et al. . | |
| 4,077,680 | 3/1978 | Ashauer et al. | 384/218 |
| 4,135,772 | 1/1979 | Stodt . | |
| 4,198,104 | 4/1980 | Crase . | |
| 4,233,821 | 11/1980 | Desalve . | |
| 4,260,202 | 4/1981 | Crase et al. . | |
| 4,295,535 | 10/1981 | Crase et al. . | |
| 4,435,661 | 3/1984 | Witten . | |
| 4,453,099 | 6/1984 | Flat . | |
| 4,511,193 | 4/1985 | Geczy . | |
| 4,521,708 | 6/1985 | Vandevier . | |
| 4,729,675 | 3/1988 | Trzeciak et al. . | |
| 5,074,681 | 12/1991 | Turner et al. . | |

FOREIGN PATENT DOCUMENTS

| | | |
|---|---|---|
| 1049969 | 7/1958 | Germany . |
| 8631287 | 11/1986 | Germany . |

*Primary Examiner*—Lenard A. Footland

[57] ABSTRACT

A spring cartridge rotor bearing is inserted into an electric motor during assembly as a preassembled unit. The rotor bearing includes a sleeve having a bore adapted to receive therethrough a shaft of the electric motor, and each end of the sleeve adapted to contact adjacent motor rotor sections. A bearing has a bore extending therethrough with the sleeve received therein. The bearing thermally locks into the stator bore early in motor warm-up and the bearing has sufficient end play on the sleeve to accommodate shaft expansion. One or more springs are located on the sleeve to bias the bearing to a neutral or generally centered position on the sleeve. The springs permit the bearing to move along the sleeve during times of thermal expansion and contraction, and prevent the bearing from becoming locked into an extreme position. This prevents the transmission of thrust loads from the rotor to the bearing.

9 Claims, 3 Drawing Sheets

SPRING CARTRIDGE ROTOR BEARING

BACKGROUND OF THE INVENTION

1. Field of the Invention

The present invention relates to rotor bearings and, more particularly, to rotor bearings used within elongated electric motors, such as the type used in electric submergible pumping systems used to recover fluids from subterranean wellbores.

2. Description of Related Art

Subterranean fluids, such as oil and water, are often pumped or "lifted" from well bores by the operation of downhole pumps, such as by electric submergible pumping systems. These pumping systems typically use an elongated electric motor installed within the wellborn to rotate a multistage centrifugal pump. These motors can extend over thirty (30) feet in length so keeping the rotating longitudinal shaft centered is critically important to the longevity of the motor.

The task of keeping the longitudinal shaft centered is accomplished by one or more sleeve-type rotor bearings spaced within the motor between adjacent rotor sections. Prior rotor bearings are typically of the configurations shown in FIGS. 1 and 2. These prior rotor bearings have a problem with the bearings improperly spinning and/or sticking in the stator, which directly leads to bearing failure. It is believed that this spinning and sticking is caused by one or more of the following factors.

When the motor is started, the shaft becomes hotter than the stator and as such can expand downward as much as 0.22 inches (in a 30 ft. motor) at the bottom end, as compared to the stator. The bearing must be able to move down through the stator bore at this time, and due to friction with the sleeve and the motor oil, the bearing will spin. If the bearing expands and sticks in the stator before thermal expansion is accomplished, the weight of the rotors above the bearing and their resistance to sliding on the shaft will thrust downwardly against the bearing. This will relatively quickly cause thrust washers to destruct, thereby directly leading to galling of the rotor and even electrical shorting of the motor. There is a need then for a bearing design that does not resist axial thermal expansion at the shaft.

By the time motor warm up is complete differential thermal expansion of the bearing relative to the stator bore should ideally have reduced the clearance of the bearing to the point that it is restricted from spinning significantly in the bore. If the bearing continues to spin, it may wear into the motor laminations, thereby filling the motor oil with destructive metallic cuttings. Efforts have been made to prevent or at least limit this spinning, but bearing spinning may not be totally prevented. There is a need then for a bearing design that as much as possible limits spinning, as well as limit the destructive results of bearing spinning.

When the motor is shut off, the shaft cools and shrinks thereby pulling the bearings up with it. The bearings also cool and should slide freely along the stator bore back to a starting position. If there is an obstruction in the stator bore, such as caused by a spinning bearing wearing a pocket in one location in the stator bore with a resulting adjacent ridge of wear material, the bearing can be prevented from freely moving. This results in the shaft being in tension, so that upon start up the thrust washers on the bearing will become rapidly worn. Once the stator bore has been damaged, the bearing cannot move freely in either direction during thermal cycling, thereby resulting in rapid wear of the thrust washers. There is a need then for a bearing design that moves freely along the stator bore and that tends to return to a natural starting position.

Prior rotor bearings are made up during motor assembly from several separate parts which leaves opportunity for errors in assembly of the motor. These separate parts tend to be randomly selected from parts bins, and are not matched for tolerances. In addition, the parts may become damaged by handling during assembly. There is a need then for a bearing design that can be preassembled from carefully selected parts, and which can be easily and quickly inserted into the motor as a unit to reduce the time of assembly and the chance for damage and/or assembly errors.

SUMMARY OF THE INVENTION

The present invention has been contemplated to overcome the foregoing deficiencies and meet the above described needs. Specifically, the present invention is a rotor bearing for insertion into an electric motor as a preassembled cartridge. The bearing assembly includes a sleeve having a bore adapted to receive therethrough a shaft of the electric motor, and each end of the sleeve is adapted to contact adjacent motor rotor sections. A bearing is included with a bore extending therethrough with the sleeve received therein. Springs are located on the sleeve to bias the bearing to a generally centered, neutral or starting position on the sleeve.

The bearing to stator fit is controlled to produce thermal lock-up before warm-up is completed. The springs permit the bearing to move longitudinally along the sleeve when the shaft thermally expands. The springs also urge the bearing back to a generally centered starting or neutral position on the sleeve to prevent the bearing from becoming stuck in one extreme position where the undesired wear pocket can result, which would limit movement and overload the thrust washer.

With this arrangement the entire rotor bearing can be assembled using carefully preselected parts in a separate environment from the motor assembly. The resulting bearing assembly will be in the form of a cartridge that can be simply slipped onto the motor shaft as a unit thereby reducing assembly time and chances of assembly errors, and ensuring higher quality.

DETAILED DESCRIPTION OF THE PREFERRED EMBODIMENTS

A spring cartridge rotor bearing is inserted into an electric motor during assembly as a preassembled unit. The rotor bearing includes a sleeve having a bore adapted to receive therethrough a shaft of the electric motor, and each end of the sleeve adapted to contact adjacent motor rotor sections. A bearing has a bore extending therethrough with the sleeve received therein. One or more springs are located on the sleeve to bias the bearing to a generally centered or neutral position on the sleeve. The springs permit the bearing to move along the sleeve during times of thermal expansion and contraction, and prevent the bearing from becoming locked into an extreme position.

Figure 1:
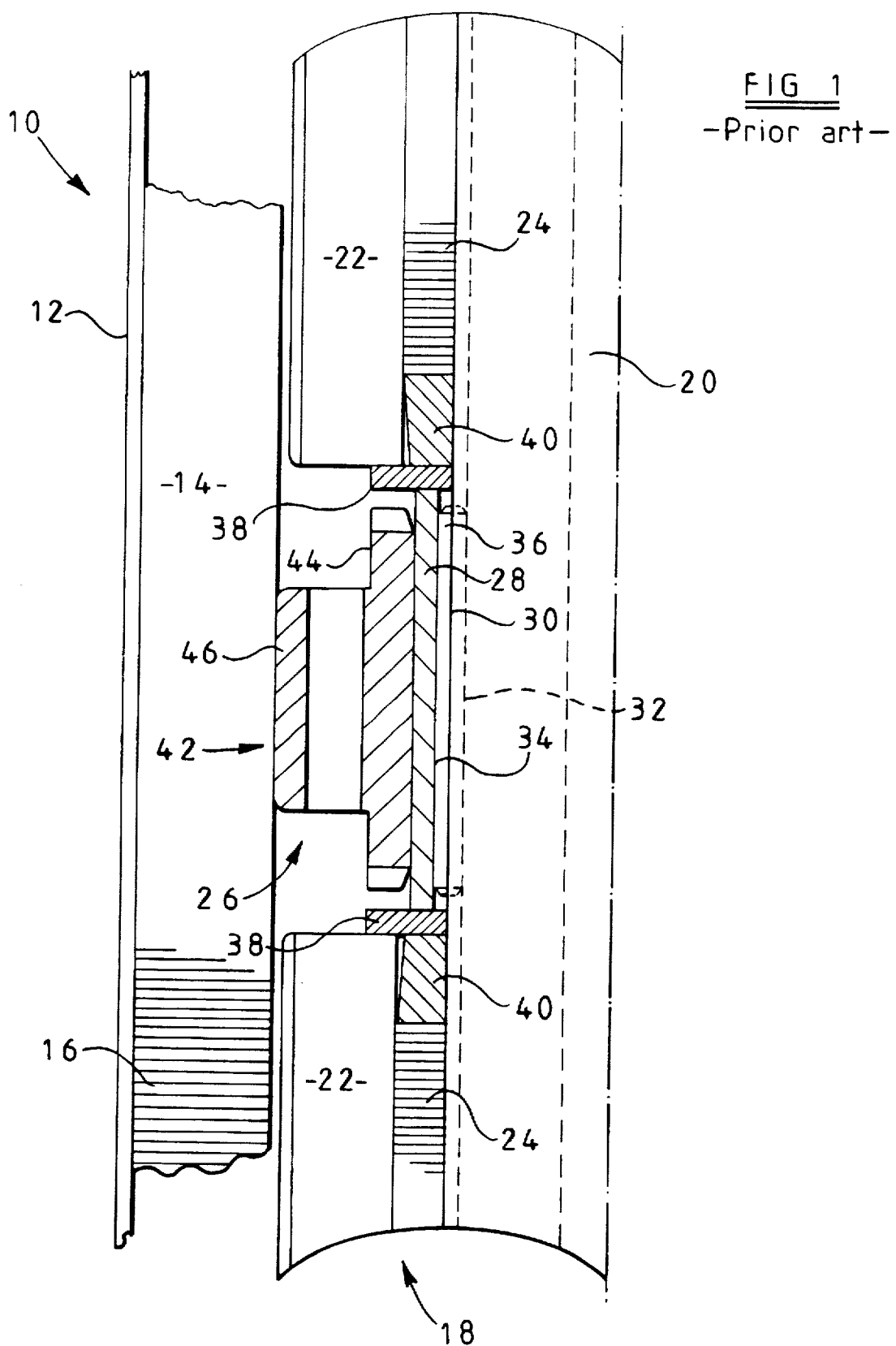
FIGS. 1 and 2 are sectioned partial elevational views of rotor bearings of the Prior Art.
Figure 2:
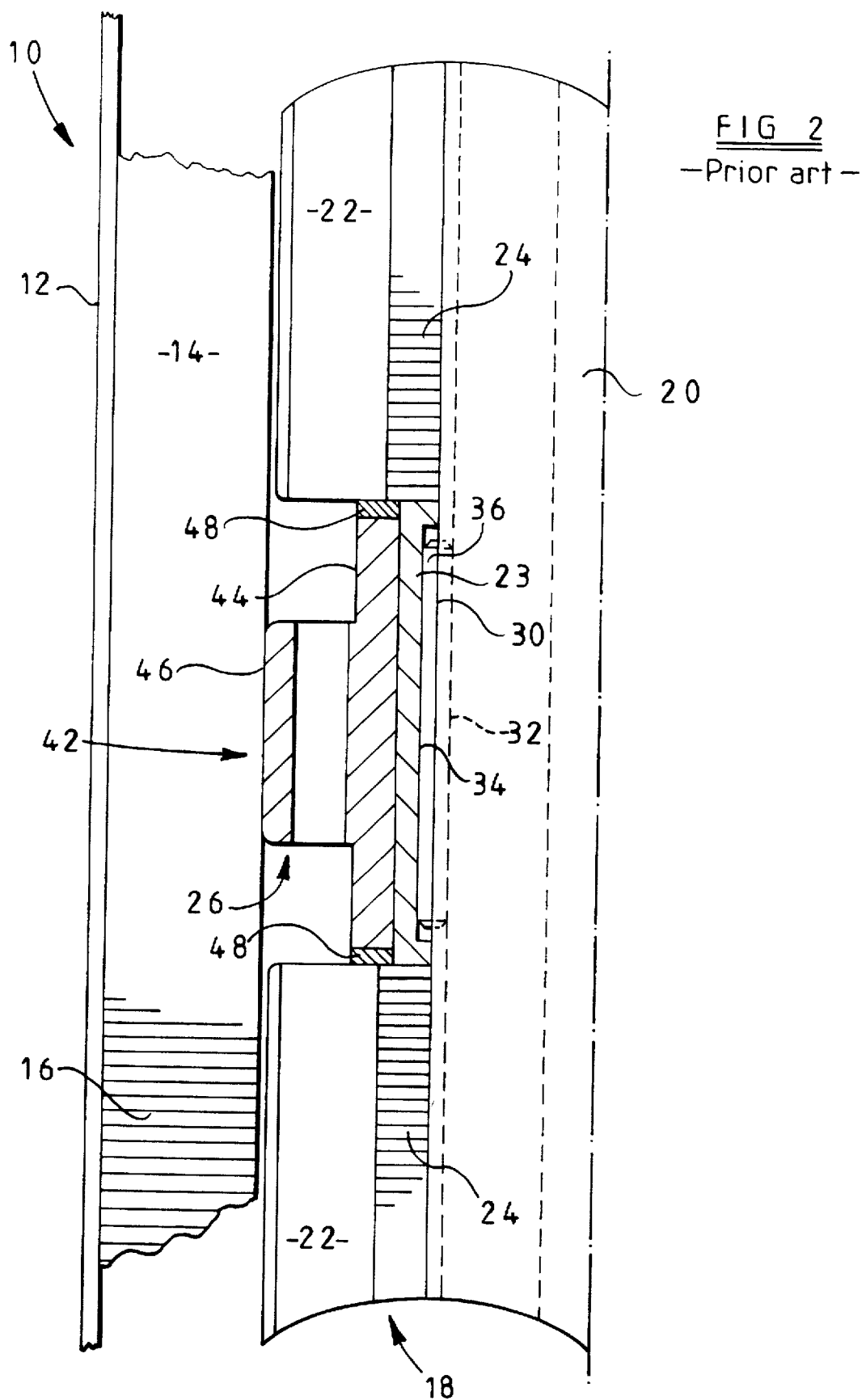

To aid in the understanding of the present invention, reference is made to the accompanying drawings. FIG. 1 illustrates a Prior Art rotor bearing of the type currently used by REDA of Bartlesville, Okla. in their electric motors. FIG. 2 illustrates a Prior Art rotor bearing of the type believed to have been used by CentriLift of Claremore, Okla. in their electric motors, as more fully described in U.S. Pat. No. 4,453,099. In both of these Figures, an electric motor 10 has an outer cylindrical housing 12 with a stator 14, formed from a plurality of metallic laminations 16, mounted therein, as is well known to those skilled in the art. The motor 10 also includes a rotor 18 that rotates about its longitudinal axis within the bore of the stator 14. The rotor 18 has an elongated shaft 20 with a plurality of rotor sections 22 keyed thereto. Each rotor section 22 is formed from a plurality of metallic laminations 24, as is well known to those skilled in the art.

Spaced between each of the rotor sections 22 is a rotor bearing assembly 26. As shown in FIG. 1, each rotor bearing assembly 26 includes an inner cylindrical sleeve 28 that has a longitudinal bore 30 with the rotor shaft 20 extending therethrough. The rotor shaft 20 includes a longitudinal groove or keyway 32, and the inner surface of the sleeve 28 includes a groove or keyway 34, into which is received a key 36 to lock the sleeve 28 to the rotor shaft 20. The sleeve 28 thereby rotates with the shaft 20 and can move longitudinally along the shaft 20.

In the Prior Art bearing assembly of FIG. 1, a thrust washer 38 is included at each end of the sleeve 28 and is in contact with adjacent rotor end rings 40 and/or rotor laminations 24. Among other functions, the thrust washers 38 function to withstand thrust loads required to push the bearings through the stator bore during warm-up, during which thermal expansion of the bearings is increasing its friction in the stator. As described previously, the thrust washers 38 may become distorted or destroyed if the sleeve 28 becomes shifted in one direction and the thrust and/or weight of the rotor sections 22 bear upon the thrust washers 38. The rotor bearing assembly 26 includes a bearing 42 formed from an inner cylindrical section 44 adapted to ride upon the sleeve 28 and an outer flange section 46 adapted to contact an inner surface of the stator 14. In the Prior Art bearing assembly of FIG. 2, the sleeve 28 is in contact with adjacent rotor end rings 40 and/or rotor laminations 24, and thrust washers 48 are included at the ends of the cylindrical section 44 of the bearing 42.

The problems with the Prior Art bearings are that these bearings will tend to remain at a location that is not centered so that any additional displacement in one direction will be prevented, thereby leading to failure of the thrust washers. Additionally, these bearings are not preassembled from carefully selected parts, and so these bearings cannot be easily and quickly inserted into the motor as a unit to reduce the time of assembly and the chance for damage.

Figure 3:
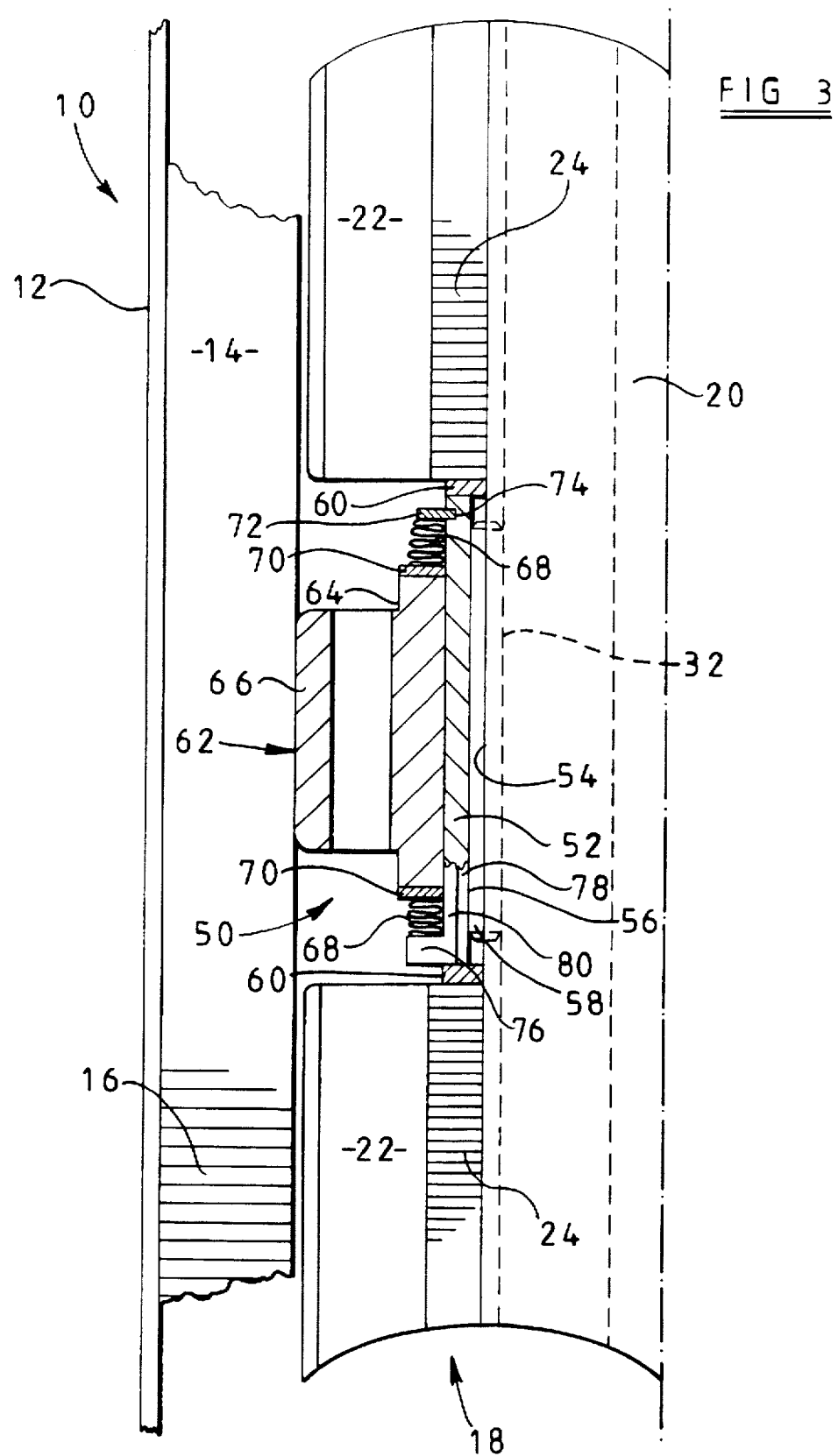
FIG. 3 is a sectioned partial elevational view of one preferred embodiment of a rotor bearing of the present invention.

FIG. 3 shows one preferred embodiment of a bearing assembly 50 of the present invention, which has been designed to overcome the problems encountered by the prior bearings. The bearing assembly 50 comprises an inner cylindrical sleeve 52 that has a longitudinal bore 54 with the rotor shaft 20 extending therethrough. The inner surface of the sleeve 52 includes a groove or keyway 56, into which is received a key 58 to lock the sleeve 52 to the rotor shaft 20. As with the prior bearing assemblies, the sleeve 52 thereby rotates with the shaft 20 and can move longitudinally along the shaft 20. Each end of the sleeve 52 preferably, but not necessarily, includes one or more spacers or washers 60, as will be discussed in detail below.

The bearing assembly 50 includes a bearing 62 formed with an inner cylindrical section 64 adapted to ride upon the sleeve 52 and an outer flange section 66 adapted to contact an inner surface of the stator 14. To assist in returning the bearing 62 to a "neutral" or generally centered starting position with respect to the adjacent rotor sections 22, springs 68 are provided on each end of the cylindrical section 64. The springs 68 preferably are a plurality of Belleville springs, a plurality of wave washers or a single wound wave washer, that act upon washers 70 and one or two snap rings 72 set within annular grooves 74 in the outer surface of the sleeve 52. In one preferred embodiment, in place of one of the snap rings 72, one end of the sleeve 52 includes a raised shoulder or protrusion 76 that acts as an integral stop, thereby eliminating the need for an additional snap ring 72. The washers 70 preferably include at least one tab (not shown) that extends into a groove(s) (not shown) in the sleeve 52 to prevent the washers 70 from spinning. The washers 70 do not take any thermal expansion thrust load but are only preloaded with the relatively light force of the springs 68. Engagement of the tab(s) against the end of the groove(s) prevent this preload from clutching to the bearing and causing it to spin with the sleeve.

The bearing assembly 50 is preferably preassembled from parts that are carefully selected and matched. The bearing assembly 50, as a unit, is slipped onto the shaft 20 between the rotor sections 22 with the ends of the sleeve 52 directly contacting the rotor sections 22 to transmit load from the upper rotor sections 22 downwardly. However, if the spacers or washers 60 are utilized, then the load is transferred through the washers 60. With the rotor bearing assembly 50 being keyed to the shaft 20, when the shaft 20 is rotated the entire rotor bearing assembly 50 is free to turn therewith. Before warm-up and thermal expansion are complete, the outer surface of the flange section 66 of the bearing 62 contacts the inner surface of the stator 14, and preferably the bearing 62 will stop turning. The relative rotary movement of the bearing 62 with respect to the sleeve 64 and the springs 68 is accommodated by the slippage of the washers 70.

When the shaft 20 and the rotor sections 22 are displaced downwardly (caused by thermal expansion), the bearing assembly 50 is permitted to move longitudinally along the shaft 20 due to the key 58 riding in the grooves 32 and 56. The bearing 62 can be moved longitudinally independent of the sleeve 52 in which event one spring will be compressed. In the event that the bearing does not lock-up but continues to spin in the stator bore and becomes stuck in this position, the other spring will be compressed when the motor is shut off and the shaft contracts, preventing thrust loads.

Other preferred embodiments of the present invention have been contemplated. In the event of very tight space requirements with a motor 10, the springs 68 on one side of the bearing 62 can be eliminated resulting in a possible reduction in the length of the sleeve 52. As mentioned previously, one or both of the spacers or washers 60 can be eliminated as well. The washers 60 should be able to withstand all expected load forces, and are not required to withstand thermal expansion thrust so the problems discussed in U.S. Pat. No. 4,453,099 are not encountered. Preferably the washers 60 and 70 are made from bakelite, Rulon, bronze, steel or combinations of these materials. In one preferred design, the washers 60 are made from bronze with one or both faces coated with a PTFE compound. If an insulting material is used, the washers 60 will provide electrical insulation between the rotor 22 and the sleeve 52, though other means of insulating, such as a non-conductive coating would be used in other embodiments.

The selection of materials for the stator 14 and the rotor bearing assembly 50 have been found to be very important. Specifically, in one preferred embodiment, the bearing sleeve 52 is formed from a hardened steel, the bearing 62 is formed from bronze, and the stator laminations 16 are formed from steel. These materials produce a faster than previously obtained locking of the bearing 62 against the stator 14 because the coefficient of thermal expansion of bronze is greater than that of steel. The clearance between the sleeve 52 and the bearing 62 increases with increasing temperature thereby eliminating bearing to sleeve interference at high temperature. Further, all steel stators cost less to manufacture than comparable bronze stators and non-magnetic (e.g. bronze) bearings minimize inductance and hysteresis in the stator and rotor magnetic fields.

Another preferred embodiment is to have the sleeve 52 formed from two separate sleeve components pinned, glued or pressed together. An inner sleeve component 78 is formed from hardened steel, and an outer sleeve component 80 is formed from a composite such as "DU" or "HI-EX"-brand material. Alternatively, the DU or HI-EX sleeve component 80 is fixed to the bore of the bearing's cylindrical section 64 and the sleeve component 78 is formed from hardened steel. This arrangement can be preferred in high temperature applications and when poor motor lubrication may result because of contamination of the motor oil with reactive well fluids and wear particles.

Whereas the present invention has been described in particular relation to the drawings attached hereto, it should be understood that other and further modifications, apart from those shown or suggested herein, may be made within the scope and spirit of the present invention.

What is claimed is:

1. A spring cartridge rotor bearing for use in an electric motor having a shaft passing through a first motor rotor section and an adjacent second motor rotor section, comprising:

a sleeve mounted to the shaft between the first and the adjacent motor rotor sections with a first end of the sleeve in contact with the first rotor section and with a second end of the sleeve in contact with the second rotor section;

a bearing having a bore extending therethrough with the sleeve received therein; and spring means on the sleeve to bias the bearing to a generally neutral position on the sleeve.

2. A spring cartridge rotor bearing of claim 1 wherein the sleeve is keyed to the shaft for rotation therewith.

3. A spring cartridge rotor bearing of claim 1 wherein the sleeve further comprises an inner sleeve and a separate outer sleeve adjacent the bearing, with the outer sleeve formed from harder material than the inner sleeve.

4. A spring cartridge rotor bearing of claim 1 wherein the bearing is formed from material less hard than the sleeve.

5. A spring cartridge rotor bearing of claim 1 wherein the spring means further comprises a first spring compressed between a first end of the bearing and a first stop adjacent the first end of the sleeve, and a second spring compressed between a second end of the bearing and a second stop adjacent the second end of the sleeve.

6. A spring cartridge rotor bearing of claim 5 wherein the first spring and the second spring each comprise a plurality of Belleville washers.

7. A spring cartridge rotor bearing of claim 5 wherein the first spring and the second spring each comprise one or more wave washers.

8. A spring cartridge rotor bearing of claim 5 wherein the first stop comprises an annular snap ring partially received into an annular recess in the sleeve.

9. A spring cartridge rotor bearing of claim 5 wherein the second stop comprises a protrusion extending from the sleeve.

* * * * *